United States Patent [19]

Tokuno et al.

[11] Patent Number: 4,696,212

[45] Date of Patent: Sep. 29, 1987

[54] ROTARY CUTTER

[75] Inventors: Masateru Tokuno, Nishinomiya; Tetsuya Sawada, Kyoto; Yasuharu Mori, Amagasaki, all of Japan

[73] Assignee: Rengo Co., Ltd., Osaka, Japan

[21] Appl. No.: 874,964

[22] Filed: Jun. 16, 1986

[30] Foreign Application Priority Data

Jun. 17, 1985 [JP] Japan ................................ 60-132821

[51] Int. Cl.[4] ......................... B26D 1/62; B23D 25/12; B27L 5/08

[52] U.S. Cl. ........................................ 83/343; 83/345; 83/365; 83/371

[58] Field of Search ................. 83/343, 345, 365, 371, 83/289, 303, 346

[56] References Cited

U.S. PATENT DOCUMENTS

| | | | |
|---|---|---|---|
| 3,683,734 | 8/1972 | Claussen | 83/343 X |
| 3,968,713 | 7/1976 | Mosburger | 83/343 X |
| 4,112,798 | 9/1978 | Yoshizawa et al. | 83/345 X |
| 4,397,204 | 8/1983 | Colombo | 83/365 X |
| 4,542,671 | 9/1985 | Kesten | 83/343 |
| 4,548,112 | 10/1985 | Thomas | 83/345 |

*Primary Examiner*—Donald R. Schran

*Attorney, Agent, or Firm*—Armstrong, Nikaido, Marmelstein & Kubovcik

[57] ABSTRACT

An improved rotary cutter for a web material is proposed. It has a pair of rolls adapted to rotate synchronously in opposite directions and an axially elongated knife secured to each roll to extend axially. A plurality of rolling bodies are arranged around each roll to bear the shock upon cutting. Different means for preventing the knives from hitting the rolling bodies are proposed. This arrangement prevents the rolls from warping due to shock upon cutting and allows the use of rolls having a smaller diameter.

4 Claims, 9 Drawing Figures

ROTARY CUTTER

The present invention relates to a rotary cutter for cutting into desired lengths a web material, such as corrugated fiberboard, continuously fed in one direction.

As shown in FIG. 3, a rotary cutter of this type has a pair of rolls 10 adapted to rotate synchronously in opposite directions. An axially elongated knife 11 is secured to the outer periphery of each roll 10 so that the web material A fed to between the rolls 10 will be cut by means of the pair of knives 11.

In cutting e.g. corrugated fiberboard by such a rotary cutter, the pair of rolls 10 are rotated at varying speeds to cut into desired lengths. For example, in the range I from the position where the knives 11 have come to the farthest position to the position where the knives 11 start to engage each other, the rolls 10 are accelerated up to the speed of web A. In the range II from the start of cutting to its completion, the roll speed is kept equal to the web speed. In the range III from the completion of cutting to the position where the knives 11 are at their farthest position, the rolls 10 are decelerated. In other words, the speed of rolls and thus knives is controlled at three steps. According to the desired cutting length, the acceleration period, deceleration period and constant-speed period have to be accurately controlled in one cycle which is very short, while the corrugated fiberboard is running at a high speed. Naturally, the web speed is not necessarily constant.

Generally, in controlling the speed of a rolling member, it is desirable to minimize its inertia moment to improve the response to speed change, thereby allowing high-speed operation and the use of a small-power motor. For this purpose, it is desirable to minimize the outer diameter of the rolls for smaller weight. However, decreasing the roll diameter would cause a decrease in the rigidity. Also, this would make the rolls liable to warping or deflection due to shock upon cutting. This would make the knives dull. If rolls having a larger diameter and thus a larger rigidity are used to improve the sharpness of the knives, a motor having a small inertia moment and a large torque will be required to drive such rolls. However, satisfactory motors meeting such requirements and having a large capacity have not been developed.

Japanese Non-examined Patent Publication No. 57-48492 discloses a rotary cutter which has a pair of hollow rolls each provided with a knife, shafts extending through the hollow rolls and having their ends supported by the machine frame, and the rolls being rotatably supported by the respective shafts through a plurality of bearings interposed between the rolls and the shafts. It aims to bear the shock upon cutting by means of the shafts to prevent the hollow rolls from warping.

Japanese Non-examined Patent Publication No. 57-138591 discloses a rotary cutter which has a pair of hollow rolls each provided with a knife, shafts extending through the hollow rolls and having their ends supported by the machine frame, and a rolling member rotatably mounted in a hole formed in the outer periphery of each hollow roll and having its outer periphery on the shaft so that the shock upon cutting will be borne by the shafts through the rolling members to prevent the hollow rolls from warping.

With these prior art rotary cutters, since the rolls driven by a motor are hollow, a small-power motor can be used to drive the rolls. However, due to the necessity of providing some space between the rolls and the shafts inserted therein, the roll diameter will be necessarily large and the minimum possible cutting length in high speed operation will be limited. Generally, the minimum possible cutting length at the maximum roll speed is limited to 90–95% of the circumference of the rolls used. Large roll diameter makes it impossible to decrease the inertia moment drastically. Thus, these prior art rotary cutters are not satisfactory.

An object of the present invention is to provide an improved rotary cutter which obviates the abovesaid short-comings and with which the minimum possible cutting length is smaller than with the conventional machines.

Another object of the present invention is to provide a rotary cutter which uses rolls having a small inertia moment, thereby increasing the response in speed control for high speed operation and allowing the use of a smaller-power motor.

In accordance with the present invention, rolling bodies are arranged around each of the rolls provided with a knife to bear the shock applied to the rolls upon cutting, and means for preventing the rolling bodies from hitting the knives is provided.

Since the shock applied to the rolls upon cutting is borne by the rolling bodies, a web material is cut securely without the rolls being warped, and the outer diameter of the rolls can be made as small as possible. Thus, the minimum possible cutting length is smaller than with conventional rotary cutters. Also, it becomes possible to decrease the inertia moment of the rolls, increase the roll speed, and decrease the power of motor used.

Other features and objects of the present invention will become apparent from the following description taken with reference to the accompanying drawings, in which.

Figure 1:
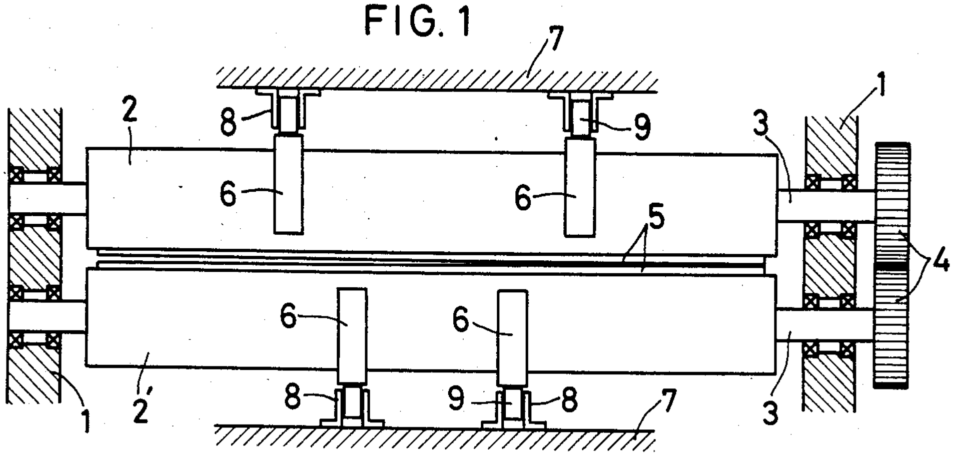
FIG. 1 is a vertical sectional front view of a rotary cutter embodying the present invention.
Figure 2:
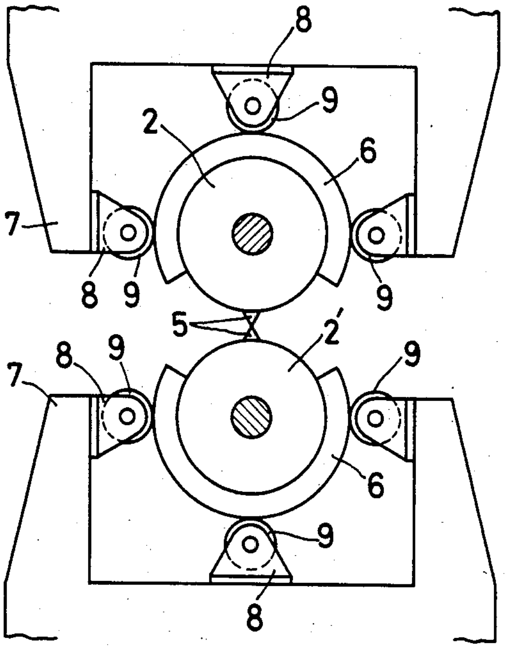
FIG. 2 is a vertical sectional side view thereof.
Figure 3:
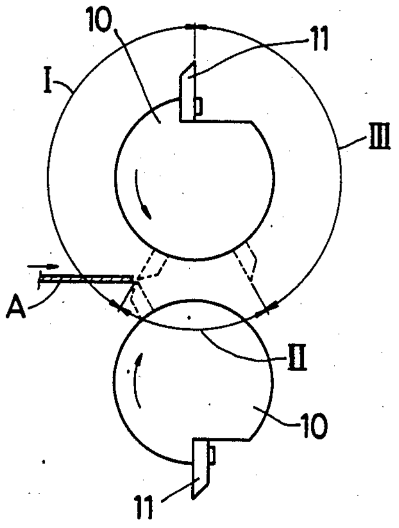
FIG. 3 is a schematic view showing how the rotary cutter operates.

Referring to FIGS. 1 and 2, a pair of rolls 2, 2' have their shafts 3 supported on frames 1 and are rotated synchronously in opposite directions by means of a pair of gears 4 secured to the ends of shafts 3 and meshing each other. An elongated knife 5 is fixedly mounted on each roll 2 (2') so as to extend axially. A web material continuously fed to between the rolls 2, 2' is cut by means of the knives 5.

On the outer periphery of each roll 2 (2'), a plurality of raised portions 6 are provided so as to extend circumferentially for most part of the circumference. The height of each raised portion 6 is greater than the knife 5, but is not so great that it will get into contact with the opposing roll 2 or 2'. (FIG. 2) The raised portions 6 on the upper roll 2 are in an axially shifted position with respect to the raised portions 6 on the lower roll 2' so that they will not hit each other while the rolls are rotating.

U-shaped frames 7 for supporting rolling bodies 9 are provided over the upper roll 2 and under the lower roll 2'. Rolling bodies 9 are rotatably supported by brackets 8 secured to each frame 7. They are adapted to roll by contact with the raised portion 6 and serve to absorb the shock upon the cutting of the web, thereby preventing the rolls from bending or warping. The number and position of the raised portions 6 and those of the rolling bodies 9 may be determined according to the diameter and the inertia moment of the rolls.

When a web material such as corrugated fiberboard is fed between a pair of rolls 2, 2' rolling in opposite directions, it will be cut by the knives 5 secured to the rolls 2, 2'. The lengths into which the web material is cut can be adjusted by controlling the speed of rotation of the rolls 2, 2'.

The shock upon cutting is applied to the rolls 2, 2' and thus to the rolling bodies 9 which are in contact with the raised portions 6 formed on the rolls 2, 2'. This arrangement prevents the rolls from warping due to the shock upon cutting and assures a secure cutting of the web material by means of a pair of knives 5.

Although in the embodiment shown in FIGS. 1 and 2, the raised portions 6 are formed to be higher than the height of knives 5 to avoid hitting of the knives against the rolling bodies 9, the means for preventing the hitting of the knives is not limited to this arrangement.

Figure 4:
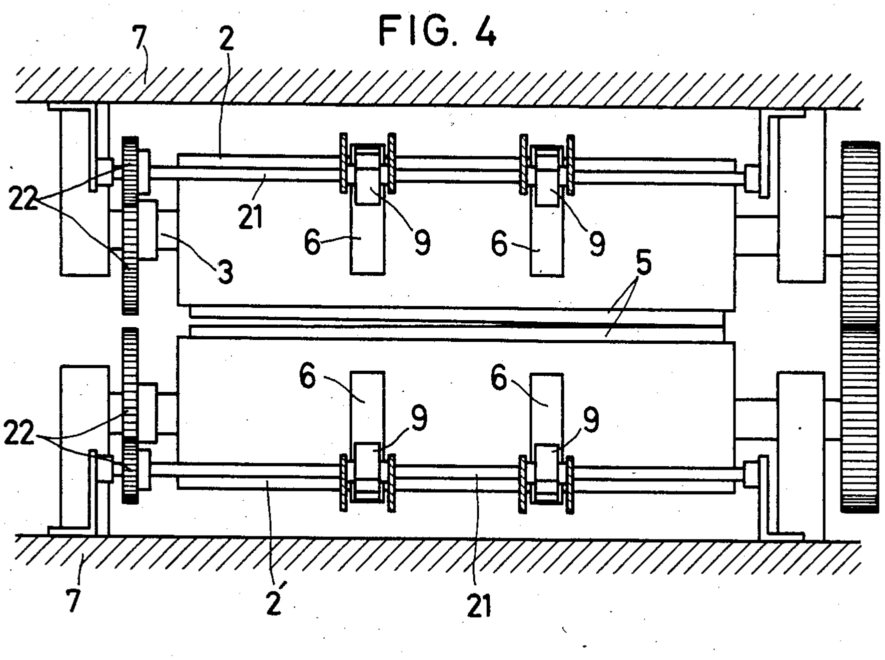
FIG. 4 is a front view of the second embodiment.
Figure 5:
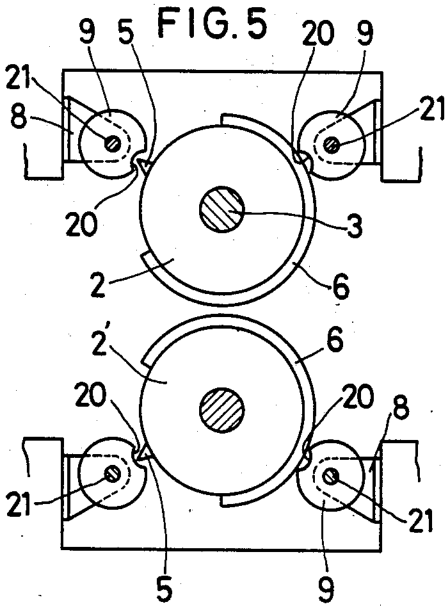
FIG. 5 is a vertical sectional side view thereof with the rolling bodies not on the raised portion.
Figure 6:
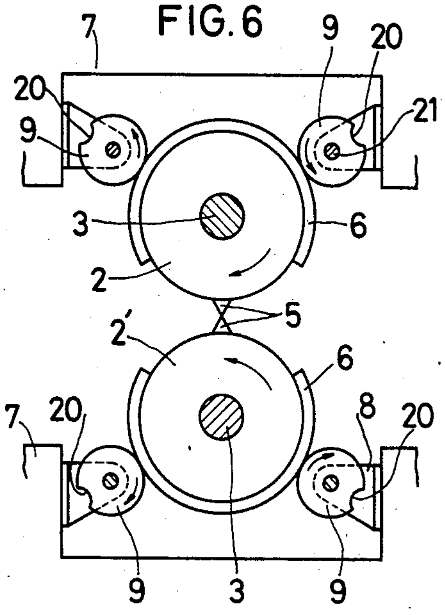
FIG. 6 is a vertical sectional side view thereof with the rolling bodies on the raised portion.

The second embodiment shown in FIGS. 4–6 uses another means for preventing the hitting of the knives. Each of the rolling bodies 9 arranged around the rolls 2, 2' is formed with a recess 20 in its outer periphery to receive the knife 5. Gears 22 mounted on shafts 21 of the rolling bodies 9 mesh with a gear 22 mounted on the shaft 3 of the roll 2 (2'). The shafts 21 of the rolling bodies 9 and the shafts 3 of the rolls 2, 2' are rotated with such a timing that the knives 5 will not hit the rolling bodies 9 but be received in the recesses 20 in the rolling bodies, and that the shock upon cutting will be borne by the rolling bodies 9. In the second embodiment, the raised portions 6 on the rolls 2, 2' have to be lower than the height of the knives 5 and the rolling bodies 9 get in contact with the raised portions 6 on the rolls 2, 2'. Alternatively, the raised portions 6 may be omitted and the rolling bodies 9 may be adapted to touch directly with the rolls 2, 2'.

Figure 7:
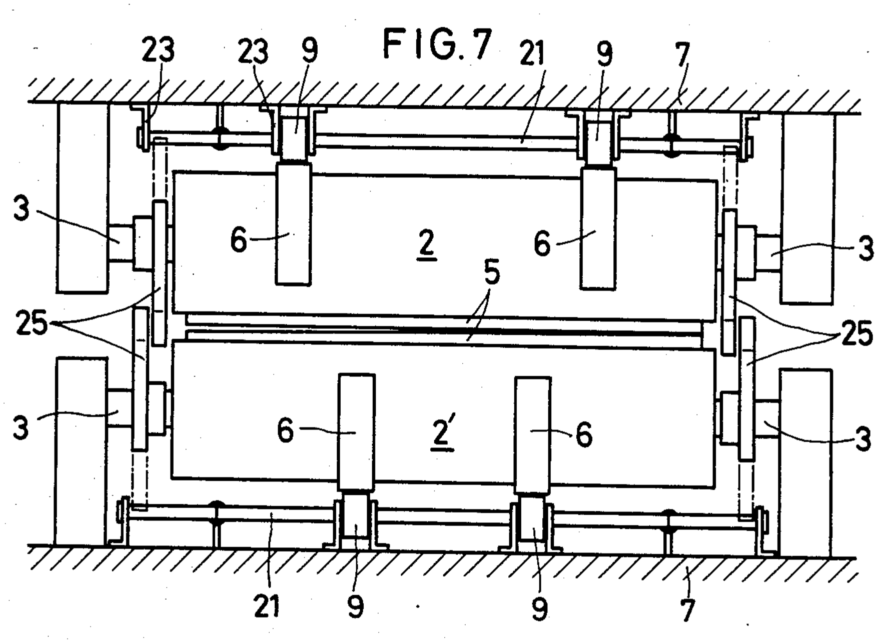
FIG. 7 is a front view of the third embodiment.
Figure 8:
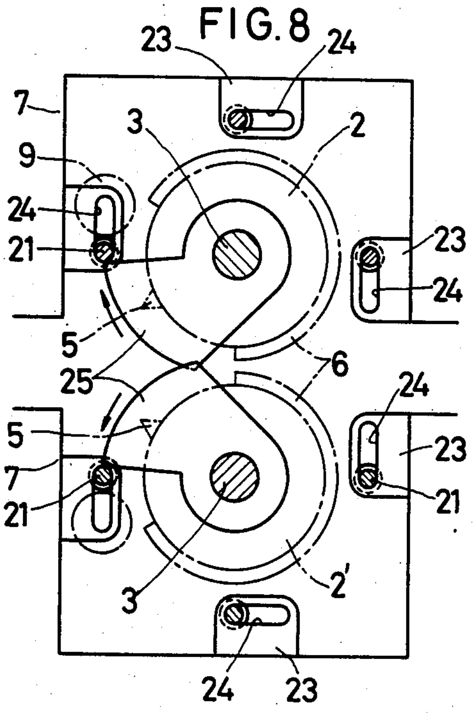
FIG. 8 is a vertical sectional side view thereof with the rolling bodies not on the raised portion.
Figure 9:
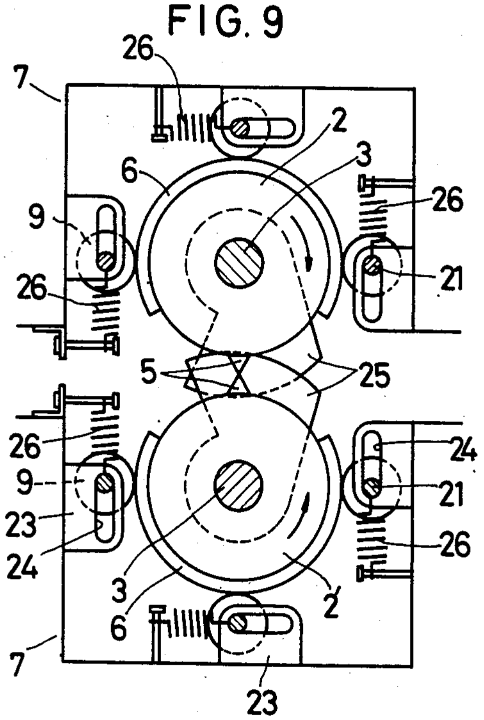
FIG. 9 is a vertical sectional side view thereof with the rolling bodies on the raised portion.

Referring to FIGS. 7–9 showing the third embodiment, each of brackets 23 secured to the frames 7 are formed with a slot 24 which is oblong in a tangential direction with respect to the roll. The shafts 21 of the rolling bodies 9 are received in the slots 24 and have their ends adapted to be engaged by cams 25 mounted on the shaft 3 of the roll 2 (2') to move the rolling bodies 9 away from the raised portions 6 on the roll 2 (2'). Each of the shafts 21 of the rolling bodies 9 is urged by a spring 26 in such a direction as to move the rolling bodies 9 into contact with the raised portions 6. In this embodiment, too, the raised portions 6 may be lower than the height of the knife 5. Further, the raised portions 6 may be omitted so that the rolling bodies 9 will touch directly with the roll 2 (2').

The means for moving the rolling bodies 9 toward and away from the rolls 2, 2' is not limited to the abovesaid arrangement using cams.

What we claim:

1. A rotary cutter for cutting a web material to desired lengths, said rotary cutter including a pair of rolls mounted to rotate synchronously in opposite directions, a knife fixedly mounted on each of said rolls so as to extend axially to cut the web material fed to a position between said rolls, and driving means for driving said rolls, characterized in that a plurality of rolling bodies are arranged around each of said rolls to bear the shock upon cutting through said rolls, that a plurality of raised portions are provided on the outer periphery of each roll so as to extend circumferentially except near said knife, and that said rolling bodies are adapted to roll on said raised portions, preventing said knives from hitting said rolling bodies.

2. A rotary cutter as claimed in claim 1, wherein said raised portions are higher than said knife.

3. A rotary cutter as claimed in claim 1, wherein said preventing means comprises a recess formed in the outer periphery of each of said rolling bodies to receive said knife, and means for driving said rolling bodies with such a timing that said knives on said rolls will be received in said recesses formed in said rolling bodies.

4. A rotary cutter as claimed in claim 1, wherein said rolling bodies are supported to be movable toward and away from the outer periphery of said rolls, and said preventing means comprises means for moving said rolling bodies away from said rolls when said knives on the rolls come near said rolling bodies.

* * * * *